April 12, 1949. A. L. HIGHBERG 2,466,949
TWO-SPEED DUAL ROTATION PROPELLER DRIVE
Filed June 30, 1945 2 Sheets-Sheet 1

INVENTOR.
BY Axel L. Highberg
Ernest D. Given
ATTORNEY

Patented Apr. 12, 1949

2,466,949

UNITED STATES PATENT OFFICE 2,466,949

TWO-SPEED DUAL ROTATION PROPELLER DRIVE

Axel L. Highberg, West Hartford, Conn., assignor to United Aircraft Corporation, East Hartford, Conn., a corporation of Delaware Application June 30, 1945, Serial No. 602,501

4 Claims. (Cl. 74—681)

This invention relates to power transmitting systems for internal combustion engines, particularly aircraft engines, and it has for its object to provide a novel and improved speed shifting mechanism for a system of this type.

Another object of the invention is to provide a simple and efficient two-speed dual rotation propeller drive for aircraft power plants.

Another object is to provide a power transmitting mechanism for aircraft including a combination fluid coupling and planetary gear system for shifting from one gear ratio to another.

Still another object is to provide a power transmitting mechanism of the foregoing type having novel and improved details of construction and features of operation.

Various other objects and advantages will be apparent as the nature of the invention is more fully disclosed.

The invention will be described in its application to a two-speed dual rotation propeller drive for aircraft, wherein one speed dual rotation of an aircraft propeller is obtained by a combination of planetary and bevel gearing. To obtain the second speed I employ a compound planetary gearing in conjunction with a fluid coupling. The shifting into second speed is accomplished hydraulically through the fluid coupling and the simultaneous release of a hydraulically actuated stop on the planetary gear train, which results in changing the speed ratio between the engine crankshaft and the propeller shaft.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the following description certain specific terms are used for convenience in referring to the various details of the invention. These terms, however, are to be interpreted as broadly as the state of the art will permit.

Figure 1:
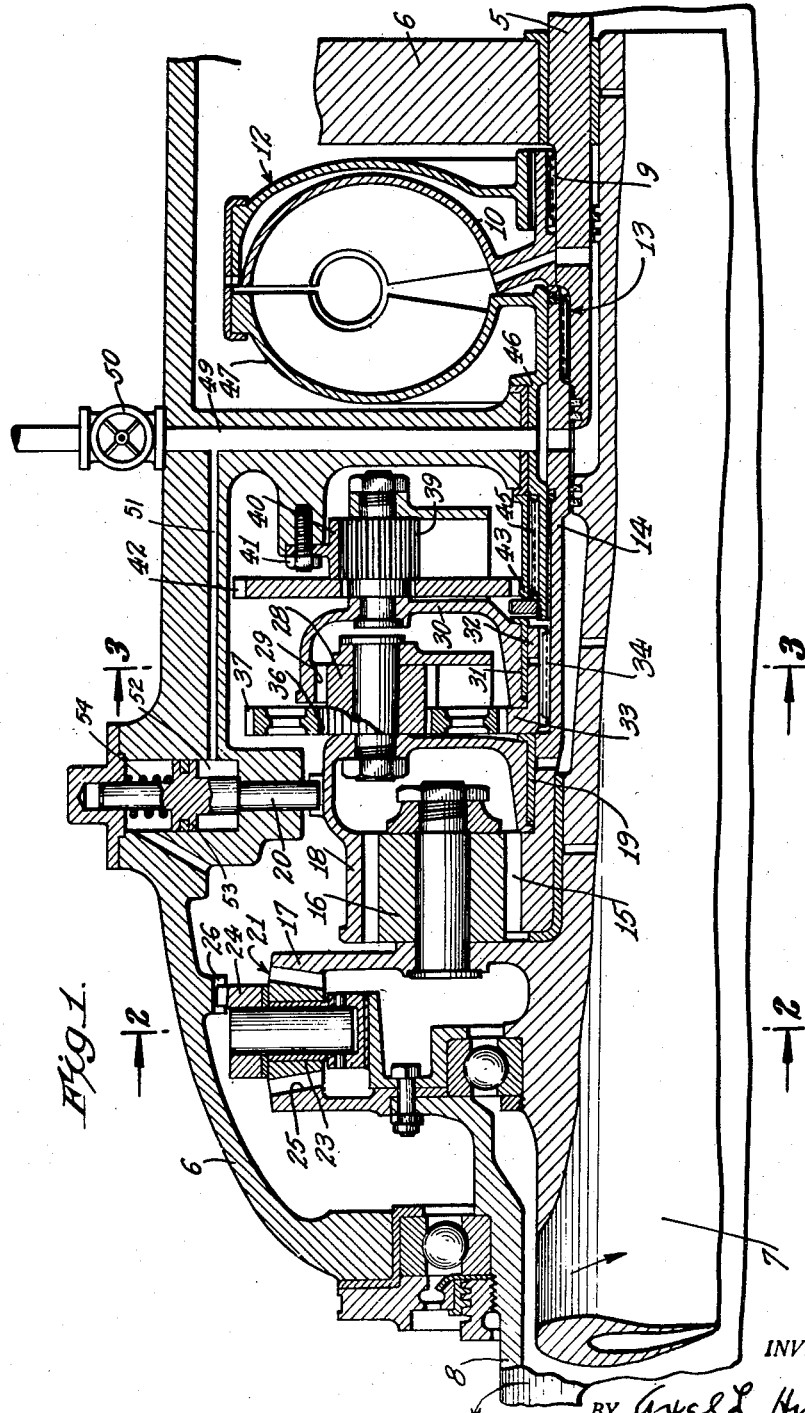
Figure 1 is a longitudinal sectional view through the crankshaft and power transmitting system of a dual propeller aircraft engine, embodying the present invention.
Figure 2:
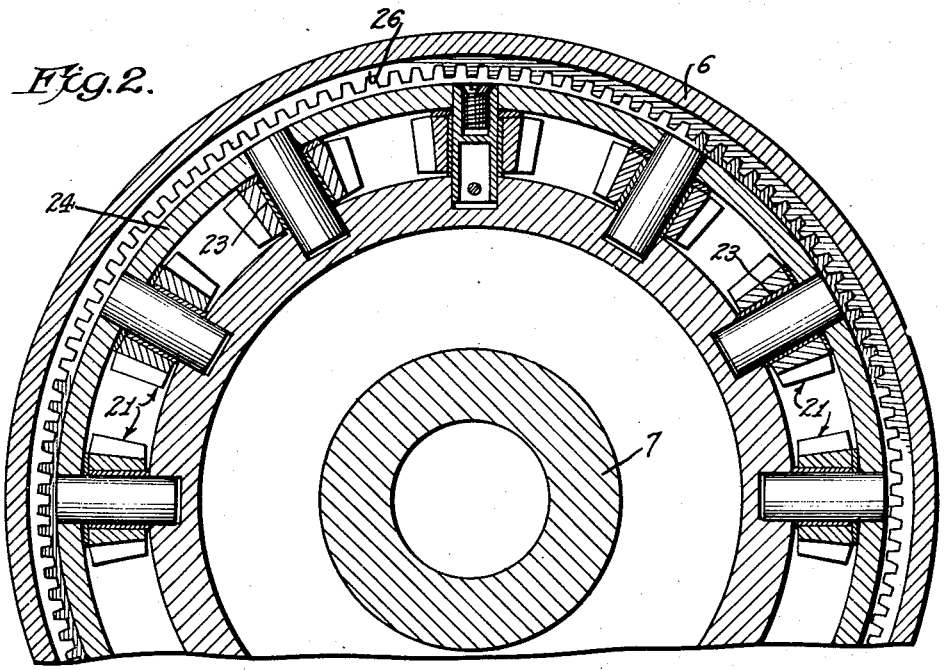
Fig. 2 is a fragmentary transverse section taken on line 2—2 of Fig. 1.
Figure 3:
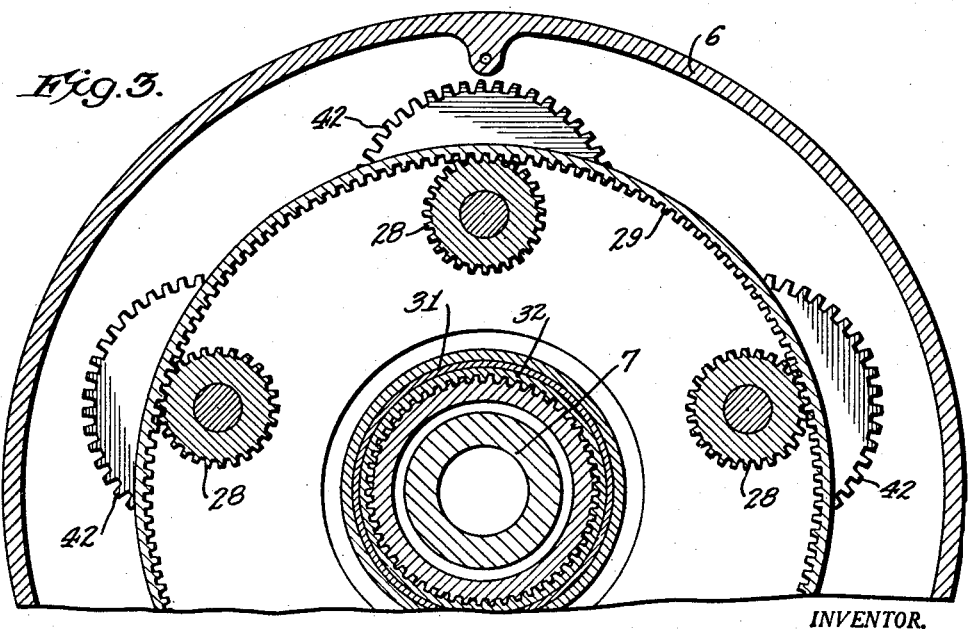
Fig. 3 is a transverse section taken on line 3—3 of Fig. 1.

In the drawings, Fig. 1 shows a crankshaft 5 which is journaled in the crankcase 6 of an aircraft engine and is adapted to drive an inner propeller shaft 7 and an outer propeller shaft 8 in a manner presently to be described.

The shafts 7 and 8 carry separate propellers (not shown) and these shafts rotate in opposite directions, as indicated by the curved arrows in Fig. 1.

The front end of the crankshaft 5 is splined at 9 to the impeller 10 of a fluid coupling 12, and is also splined at 13 to a sleeve 14 which has a set of external gear teeth 15 meshing with pinion gears 16 mounted on a cage 17 formed on the inner propeller shaft 7.

The pinion gears 16 also mesh with internal teeth provided in a bell housing 18 mounted on a bearing 19 surrounding the sleeve 14.

The bell housing 18 is in the lower speed drive ratio locked against rotation by a hydraulically actuated stop 20 in the crankcase 6, so that the drive for the lower speed, with the coupling 12 empty, is from the crankshaft 5 through the sleeve 14 and the pinions 16 to the cage 17, rotating the inner propeller shaft 7.

Rotation is imparted to the outer propeller shaft 8 from the shaft 7 through a bevel gear train 21 including pinions 23 carried by a pinion cage 24 and meshing with gear 25 formed on the outer propeller shaft 8. Gear teeth splines 26 formed on the crankcase 6 and the pinion cage 24 hold said pinion cage against rotation but leave it free to move in an axial direction. The purpose of this gearing is to reverse the direction of the outer propeller shaft 8 with respect to the inner propeller shaft 7.

The mechanism for changing the speed ratio between the engine crankshaft 5 and the propeller shaft 7 includes the compound planetary gear train which will now be described. The bell housing 18 carries pinion gears 28, and one portion of each such pinion gear meshes with the internal teeth 29 of a bell housing 30 supported by bearing 31 on the annular flange 32 of a gear 33 which is splined at 34 to the sleeve 14, while the other portion of each pinion gear 28 is splined to the internal teeth 36 of a gear 37 which meshes with the gear 33, as shown in Fig. 1.

The bell housing 30 carries spur pinion gears 39 one portion of each of which meshes with a fixed internally toothed ring gear 40 secured to the crankcase by bolts 41, and the other portion 42 of which meshes with an externally toothed gear 43 splined at 45 to a bearing sleeve 46 which is part of the runner 47 of the fluid coupling 12.

For changing the speed ratio between the crankshaft 5 and the propeller shaft 7, the fluid coupling 12 is filled with oil through the oil line 49 which is controlled by a suitable valve 50, and the hydraulically actuated stop 20 is simultaneously released, permitting the bell housing 18 to be rotated forwardly by the gear train comprising gears 43—42, bell housing 30, and gears 29—28, thus giving a higher speed of rotation when the fluid coupling is filled. At the same time oil passes into the line 49, it flows under the pressure available on the oil through a lateral passage 51 to a cylinder 52 below a piston 53 therein, which piston is carried by and serves to actuate the stop 20. A compression spring 54 is shown in this cylinder tending to urge the stop 20 toward the full line position shown in Fig. 1 whenever fluid pressure is not supplied to the cylinder 53 beneath the piston sufficient to overcome the force of this spring. Upon the admission of fluid pressure to the line 49, this pressure forces the piston 53 upwardly (as show, Fig. 1) in the cylinder 52, so as to withdraw the stop 20 from the position shown and hence to permit the rotation of the bell housing 18.

The gear 33 is driven directly from the crankshaft so that a portion of the power required to operate the speed change is derived from the crankshaft. The gears 33 and 37, comprising part of the compound planetary gear train, effect a reduction in speed with resulting reduction in the power required to drive the fluid coupling. The ratio of the various gears is such that the bell housing 18 is permitted to run or feed forward at a predetermined rate.

It will be seen from the foregoing that the fluid coupling 12 provides a means for obtaining a variation of speeds from low to high speed. The compound planetary gearing to the fluid coupling serves the purpose of reducing the speed from the coupling to the bell housing 18. This reduction, in turn, reduces the power required to operate the fluid coupling and also enables the use of a fluid coupling of moderate size.

The operation at the lower speed has been in part described above, this operation being a fixed ratio positive drive which takes place as follows. Assuming the engine or driving shaft 5 to be operated and the direction of rotation to be counterclockwise as seen from the right of Fig. 1, the driving shaft 5 will positively rotate the sleeve 14 in a counterclockwise direction and at the same speed, as these parts are splined together at 13. The sleeve 14 carries the external gear teeth 15 as aforesaid and thus will cause the positive rotation of the planetary pinions 16, so as to move the cage 17 in the same or counterclockwise direction and at a predetermined reduced speed relative to the speed of the shaft 5 and sleeve 14 due to the fact that the bell housing 18 is at this time locked by the positive stop 20. The driven shaft 7, which is rigid with the cage 17 as shown, is thus positively driven in the same direction as and at a predetermined reduced speed relative to the speed of the driving shaft 5.

The driven shaft 8 in this case will be rotated in the opposite direction from the shaft 7 through the gears 17 and 25 and the intermediate pinions 23, the axes of which pinions are maintained stationary by the spline connection 24—26.

During this time and still considering the operation at the low speed, and considering directions of rotation always as seen from the right in Fig. 1, the gear 33 will be positively rotated in a counterclockwise direction due to the spline connection at 34 between the sleeve 14 and the gear 33. Meshing with the gear 33 are a plurality of planetary gears 37 carrying rigid therewith the panetaries 28. As the axes of these planetaries are carried by the bell housing 18, and as the bell housing 18 is itself stationary, being locked by the stop 20, the bell housing 30 will be positively driven in a clockwise direction through the gearing shown and generally described hereinabove, which will similarly rotate the axes of the planetary gears 42, 39 in a clockwise direction. Due to the internal ring gear 40 being stationary and meshing with smaller diameter gears 39, and due to the meshing of the gears 43 on the sleeve 46, the latter will similarly be rotated in a clockwise direction but at a higher peripheral speed than the bell housing 30. This will rotate the runner 47 of the fluid coupling 12 in a clockwise direction, i. e. in the opposite direction from the impeller 10 thereof (which rotates with the shaft 5). At this time, however, the fluid coupling is assumed to be empty of fluid, so that this reverse rotation of the elements thereof is immaterial and will not result in any substantial undesired drag upon the drive as aforesaid. This condition obtains as long as the stop 20 is in the position shown.

Upon the supplying of fluid pressure to the line 49 under control of the valve 50, the first action to take place is the withdrawal of the stop pin 20, due to the flow of fluid pressure through the passage 51 and the upward movement of the piston 53 in the cylinder 52 against the spring 54. When this has occurred, so that the bell housing 18 is free to rotate, the flow of fluid through the passages shown to the interior of the fluid coupling 12 may then act, first to slow down and stop reverse rotation of the runner 47 in respect to the impeller 10, and thereafter to cause these parts to rotate in the same direction, there being in most instances some slippage between these parts, so that the drive is not as positive as is a mechanical drive, as is well known in the art in respect to fluid coupling apparatus.

Assuming first a condition wherein the runner 47 has been brought to a stop position, although the drive shaft 5 continues to rotate in a counterclockwise direction as previously assumed, the sleeve 46 will then be stationary, and as the internal gear 40 is maintained stationary, the gears 39 and 42 will also be stationary as will the bell housing 30. However, as the gear 33 is rotated positively through the sleeve 14 and spline 34 and in a counterclockwise direction, the bell housing 18 will be driven in the same direction as the drive shaft 5 and sleeve 14, but at a slower speed than that of the rotation of the drive shaft. Under these circumstances the speed of the bell housing 18 will be added to the speed imparted to the cage 17 through the planetary pinions 16, so that the cage 17 and hence the driven shaft 7 will be rotated in the same direction as before, i. e. in the direction shown by the arrow on the drawing, but at a higher speed that that previously assumed, i. e. higher than the predetermined speed ratio when the housing 18 is locked as aforesaid. This condition is gradually attained as the clockwise rotation of the runner 47 is brought to a stop due to liquid, usually oil, having been introduced into the fluid coupling.

As the runner 47 of the fluid coupling picks up speed in the same direction (counterclockwise) as the drive shaft, due to fluid friction within the coupling, there will be a bodily movement of the planetary gears 39 and 42 around the axis of the drive shaft in the same direction as the rotation of the drive shaft, thus causing the bell housing 30 to rotate in the same direction as the drive shaft, but at a lower speed. This rotation of the bell housing 30 will serve to increase the speed of the bell housing 18 due to the second planetary arrangement, including the gears 28 and 37. This arrangement of one planetary more or less superimposed upon another I have chosen to call a "compound planetary gear train" as this seems to be the most appropriate term therefor.

It will further be seen that the increase in speed available upon the actuation of the fluid coupling is progressive and determined by the positive or negative type of rotation of the fluid coupling members in respect to each other, reverse rotation being assumed negative for this description and rotation of the runner in the same direction as the impeller being assumed positive. As the negative rotation, as herein defined, in the fluid coupling is progressively reduced toward zero and/or positive rotation from zero toward the speed of the impeller progresses, the speed of rotation of the bell housing 18 progressively increases, so that the speed of the driven shaft 7 increases in respect to its initial predetermined speed, as aforesaid. In all cases the driven shaft 7 will be rotated in the same direction as the drive shaft 5. On the other hand, the driven shaft 8, due to the reverse gearing generally indicated at 21, will always rotate in the opposite direction from that of the drive shaft 5.

Although a specific embodiment has been shown and described herein for purposes of illustration, it will be evident to those skilled in the art that the invention is capable of various other modifications and adaptations within the scope of the appended claims.

What I claim is:

1. A multi-speed transmission apparatus, comprising a driving shaft, a driven shaft, planetary gearing interposed between said driving and driven shafts including a reaction gear carried by a bell housing, means for selectively locking said bell housing against rotation to cause said driving shaft to drive said driven shaft through said planetary gearing, a fluid coupling including an impeller driven by said driving shaft and a runner and adapted to be filled with fluid only when said bell housing is unlocked, a gear train between said runner and said bell housing for rotating said bell housing in response to the rotation of said runner when said bell housing is unlocked, said gear train being so constructed and arranged that when said bell housing is locked, said runner will be rotated through said gear train in response to the rotation of said driving shaft and in a direction opposite that of the rotation of said impeller, means for unlocking said bell housing, and means for admitting fluid to said fluid coupling for slowing down and stopping the relative reverse rotations of said runner and said impeller and for causing said runner to rotate in the same direction as said impeller, so as to increase the speed of said driven shaft in respect to that of said driving shaft as compared to the speed ratio of these shafts when said bell housing is locked.

2. A multi-speed transmission apparatus in accordance with claim 1, wherein said gear train includes at least one set of planetary gearing and further includes a gear rotated positively by said driving shaft, so arranged that when said bell housing is locked, said runner will be positively rotated in response to the rotation of said driving shaft and in a predetermined direction in respect to the direction of rotation of said driving shaft, the direction of rotation of said runner being the reverse of that of said impeller.

3. A multi-speed transmission apparatus in accordance with claim 1, wherein said gear train comprises a plurality of pairs of planetary gears rotatable about axes fixed with respect to said bell housing, a sun gear positively rotated by said driving shaft meshing with one of each of said pairs of gears, an internal gear carried by a second bell housing meshing with the other of each of said pairs of gears, a second series of pairs of planetary gears rotatable about axes fixed with respect to said second bell housing, a stationary reaction gear meshing with one gear of each pair of said second series of planetary gears, a gear fixed with respect to said runner meshing with the other of each pair of said second series of planetary gears, the parts being so constructed and arranged that when the first-named bell housing is locked, said runner will be positively rotated by said driving shaft in a reverse direction in respect to the direction of rotation of said impeller by said driving shaft.

4. A multi-speed transmission apparatus comprising a driving shaft, a driven shaft, a gear driven by said driving shaft, pinion gears carried by said driven shaft and meshing with said first mentioned gear, a bell housing having teeth meshing with said pinion gears, means for locking said bell housing against rotation to cause said driving shaft to drive said driven shaft through said pinion gears, a fluid coupling including an impeller driven by said driving shaft and a runner, a gear train between said runner and said bell housing, including two sets of planetary gears, a sun gear rotated positively by said driving shaft and cooperating with the gears of one of said sets, a second bell housing having an internal gear cooperating with the planetaries of the first-named set thereof, a stationery reaction gear cooperating with one of the planetary gears of each of the second named set thereof, and a sleeve having a gear meshing with the other of the planetary gears of the second-named set thereof and carrying said runner, said gear train being so constructed and arranged that when the first named bell housing is locked, said runner will be positively rotated by said driving shaft in a reverse direction in respect to the direction of rotation of said impeller by said driving shaft, a hydraulic cylinder arranged to unlock said first-named bell housing upon the admission of fluid thereto, and a common means for admitting fluid to said hydraulic cylinder and for admitting fluid to said fluid coupling, so that upon the unlocking of the first-named bell housing, the fluid admitted to said fluid coupling will be effective first to slow down and stop the reverse rotation of said runner and said impeller and thereafter to effect a fluid drive from said impeller through said gear train to said first-named bell housing so as to increase the speed of said driven shaft for a given speed of said driving shaft.

AXEL L. HIGHBERG.

REFERENCES CITED

The following references are of record in the file of this patent:

UNITED STATES PATENTS

| Number | Name | Date |
|---|---|---|
| 2,123,057 | Martin | July 5, 1938 |
| 2,135,246 | Yoxall | Nov. 1, 1938 |
| 2,248,240 | King | July 8, 1941 |
| 2,312,849 | Pollard | Mar. 2, 1943 |
| 2,329,733 | Watson | Sept. 21, 1943 |